(12) United States Patent
Burges et al.

(10) Patent No.: US 8,332,411 B2
(45) Date of Patent: Dec. 11, 2012

(54) BOOSTING A RANKER FOR IMPROVED RANKING ACCURACY

(75) Inventors: Christopher J. C. Burges, Bellevue, WA (US); Qiang Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/032,697

(22) Filed: Feb. 18, 2008

(65) Prior Publication Data

US 2009/0106232 A1 Apr. 23, 2009

Related U.S. Application Data

(60) Provisional application No. 60/999,638, filed on Oct. 19, 2007.

(51) Int. Cl.
G06F 7/00 (2006.01)
G06E 1/00 (2006.01)
(52) U.S. Cl. .......................................... 707/748; 706/16
(58) Field of Classification Search ........................ None
See application file for complete search history.

(56) References Cited

U.S. PATENT DOCUMENTS

| | | |
|---|---|---|
| 6,269,368 B1 | 7/2001 | Diamond |
| 6,463,426 B1 | 10/2002 | Lipson et al. |
| 6,529,916 B2 | 3/2003 | Bergman et al. |
| 6,578,040 B1 | 6/2003 | Syeda-Mahmood et al. |
| 6,654,742 B1 | 11/2003 | Kobayashi et al. |
| 6,701,318 B2 | 3/2004 | Fox et al. |
| 6,738,764 B2 | 5/2004 | Mao et al. |
| 6,871,202 B2 | 3/2005 | Broder |
| 7,080,073 B1 | 7/2006 | Jiang et al. |
| 7,188,106 B2 | 3/2007 | Dwork et al. |
| 7,231,405 B2 | 6/2007 | Xia |
| 7,257,577 B2 | 8/2007 | Fagin et al. |
| 7,260,573 B1 | 8/2007 | Jeh et al. |
| 2003/0037074 A1 | 2/2003 | Dwork et al. |
| 2003/0046098 A1 | 3/2003 | Kim |
| 2005/0004897 A1 | 1/2005 | Lipson et al. |
| 2005/0060290 A1 | 3/2005 | Herscovici et al. |
| 2005/0216434 A1 | 9/2005 | Haveliwala et al. |
| 2005/0222981 A1 | 10/2005 | Lawrence et al. |
| 2005/0246358 A1 | 11/2005 | Gross |
| 2006/0179043 A1 | 8/2006 | Ryan et al. |
| 2006/0195440 A1* | 8/2006 | Burges et al. ..................... 707/5 |
| 2006/0235842 A1 | 10/2006 | Szekely et al. |
| 2006/0294068 A1 | 12/2006 | Li et al. |
| 2007/0094171 A1* | 4/2007 | Burges et al. .................. 706/16 |
| 2007/0106659 A1 | 5/2007 | Lu et al. |
| 2007/0143273 A1 | 6/2007 | Knaus et al. |
| 2007/0150473 A1 | 6/2007 | Li et al. |
| 2007/0174872 A1 | 7/2007 | Jing et al. |
| 2007/0219980 A1 | 9/2007 | Songfack |

(Continued)

OTHER PUBLICATIONS

Joachims "Optimizing Search Engines Using Clickthrough Data" SIGKDD 2002 Edmonton, Alberta, Canada, ACM 2002.*

(Continued)

*Primary Examiner* — Pierre Vital
*Assistant Examiner* — Berhanu Mitiku

(57) ABSTRACT

A system described herein includes a trainer component that receives an estimated gradient of cost that corresponds to a first ranker component with respect to at least one training point and at least one query. The trainer component builds a second ranker component based at least in part upon the received estimated gradient. The system further includes a combiner component that linearly combines the first ranker component and the second ranker component.

18 Claims, 10 Drawing Sheets

U.S. PATENT DOCUMENTS

2007/0276812 A1    11/2007    Rosen

OTHER PUBLICATIONS

Lazier et al. "Learning to Rank using Gradient Descent" Microsoft, One Microsoft Way Redmond, WA 98052-6399 Machine Learning, Bonn, Germany, 2005, pp. 89-96.*

Friedman et al. "Multiple additive regression trees with application with epidemiology" Department of Statistics, Stanford University, U.S.A. Statistics in Medicine 2003, pp. 1365-1381.*

Freund et al, "An Efficient Boosting Algorithm for Combining Preferences", pp. 1-9.

Joachims "Optimizing Search Engines using Clickthrough Data", Department of Computer Science, Cornell University, Ithaca, pp. 1-10.

Burges et al, "Learning to Rank using Gradient Descent", Microsoft Research, 2005, pp. 1-8.

"Query Clustering for Boosting Web Page Ranking", http://www.springerlink.com/content/p4v0vatky85aj2f7/.

Friedman,"Greedy function approximation: a gradient boosting machine", North Ryde, Feb. 24, 1999,pp. 1-34.

Metzler et al., "Direct Maximization of Rank-Based Metrics for Information Retrieval", 2005, 8 pages.

Klementiev et al., "An Unsupervised Learning Algorithm for Rank Aggregation", ECML 2007, 8 pages.

Adali et al., "The Impact of Ranker Quality on Rank Aggregation Algorithms:Information vs. Robustness", Proceedings of the 22nd International Conference on Data Engineering Workshops (ICDEW'06) 0-7695-2571-7/06 2006 IEEE, 10 pages.

Fernández et al., "Probabilistic Score Normalization for Rank Aggregation", Apr. 2006, 4 pages.

Burges, et al., "Learning to Rank with Nonsmooth Cost Functions", NIPS, 193-200, 2007.

Friedman, et al., "Additive logistic regression: a statistical view of boosting", The Annals of Statistics, 28(2):337-407, 2000.

Jarvelin, et al., "IR evaluation methods for retrieving highly relevant documents", SIGIR, 41-48, 2000.

Kleinberg, "Authoritative sources in a hyperlinked environment", SODA, 668-677, 1998.

Ailon, "Aggregation of Partial Rankings, p-ratings and top-m lists", SODA, pp. 415-424, 2007.

Dwork, et al., "Rank Aggregation Revisited", Compaq System Research Center, pp. 1-19, 2001.

* cited by examiner

BOOSTING A RANKER FOR IMPROVED RANKING ACCURACY

RELATED APPLICATION

This application claims priority to U.S. Provisional Patent Application No. 60/999,638, filed on Oct. 19, 2007, and entitled BOOSTING A RANKER FOR IMPROVED RANKING ACCURACY. The entirety of this application is incorporated herein by reference.

BACKGROUND

Search engines typically output search items in a ranked manner, where a search item that is determined to be highly relevant to an input query and/or user is displayed relatively high on a list of search items when compared to a search item that is determined to be less relevant to the query and/or user. Properly ranking search items is an important task, as a typical user is not willing to sift through several pages of search items, but instead only reviews a first, relatively small number of search items. Thus, often a user will assume that a small subset of search items shown on a first page is most relevant to the user and query, when, in actuality, the user may have found a search item on a subsequent page that is most relevant to the user and query.

Ranking of search items is performed by ranking algorithms (rankers), which conventionally classify items into predefined classifications (e.g., very good, good, fair, poor). Items are then displayed based at least in part upon the classification. Information retrieval metric methods are used to determine the quality of a ranking generated by a ranker, as well as a cost of a ranking generated by a ranker (e.g., a higher measure of quality corresponds to a lower measure of cost). More specifically, a ranker is provided with labeled data (e.g., the relevance of search items to a query is known a priori) and outputs an ordered list of search items. An information retrieval metric method is used to determine a quality of the rankers based upon the ordered list of search items. Different information retrieval metric methods use different parameters to output a quality metric; however, they output a quality metric based upon the ordering in the list of search results, and not upon scores individually assigned to search items.

Machine learning systems have conventionally been employed to develop rankers, wherein the machine learning systems are typically trained using a cost function that is desirably minimized during training of the machine learning system. Optimizing rankers with respect to cost functions (or information retrieval metric methods) directly, however, is a non-trivial task, because many ranking algorithms require that the gradient of the cost with respect to the score assigned by the ranker be smooth. Because information retrieval metrics depend only on the ranked order of the items together with their labels, and in particular do not depend directly on scores output by rankers, such metrics (when viewed as functions of the ranker score) are either flat (zero gradient) or discontinuous (no gradient defined) everywhere.

Furthermore, combining rankers or creating a ranker by way of boosting may be problematic. For example, in some instances, two rankers combined (e.g., linearly combined) may provide more accurate rankings when compared to each ranker operating individually. Optimizing a combination of rankers, however, is likewise non-trivial due to difficulties associated with measuring quality of rankers.

SUMMARY

The following is a brief summary of subject matter that is described in greater detail herein. This summary is not intended to be limiting as to the scope of the claims.

Various technologies relating to boosting an existing baseline ranker component are described in detail below. A baseline ranker component may be trained using labeled data (training points) and queries that correspond to the labeled data, such that an order that items should be presented to a user with respect to a query is known before the query is issued. The fact that a proper ranking is known beforehand allows a quality metric to be assigned to the baseline ranker component (with respect to the queries and labeled data) and also allows an estimate of a gradient of a cost corresponding to the baseline ranker component to be determined. In an example, if sufficient labeled data and queries exist, parameters of a baseline ranker component may be slightly altered, which may cause scores assigned to a training point (with respect to a query) to change, which may then cause the ranking of the training point to alter. A (smooth) estimate of a cost function may then be ascertained, and accordingly an estimate of a gradient of the cost function may be determined. In another example, a lambda gradient can be determined with respect to labeled data that corresponds to a non-smooth cost function.

The estimated gradients or lambda gradients may then be used to train a second ranker component, wherein the second ranker component is designed to reduce a cost associated with the baseline ranker component when linearly combined with the baseline ranker component. For instance, estimated gradients or lambda gradients may be used as targets for machine learning. Pursuant to an example, the estimated gradients of cost or the lambda gradients of cost may be modeled to facilitate building a second ranker component that, when linearly combined with the baseline ranker component, results in a decrease of cost (as determined for the baseline ranker component).

Once the second ranker component is built, scores assigned to training points by the baseline ranker component and the second ranker component can be analyzed, and the baseline ranker component and the second ranker component may be linearly combined in a manner such that the resulting combination is optimized or substantially optimized with respect to a selected information retrieval metric method. The combination of the baseline ranker component and the second ranker component may then be considered collectively as the baseline ranker component, and the above described process can be iterated until a threshold number of ranker components have been linearly combined, for instance. In another example, the process can be iterated until cost of a resultant linear combination ceases to decrease or quality of a resultant linear combination ceases to increase.

Other aspects of the present application will be appreciated upon reading and understanding the attached figures and description.

DETAILED DESCRIPTION

Figure 1:
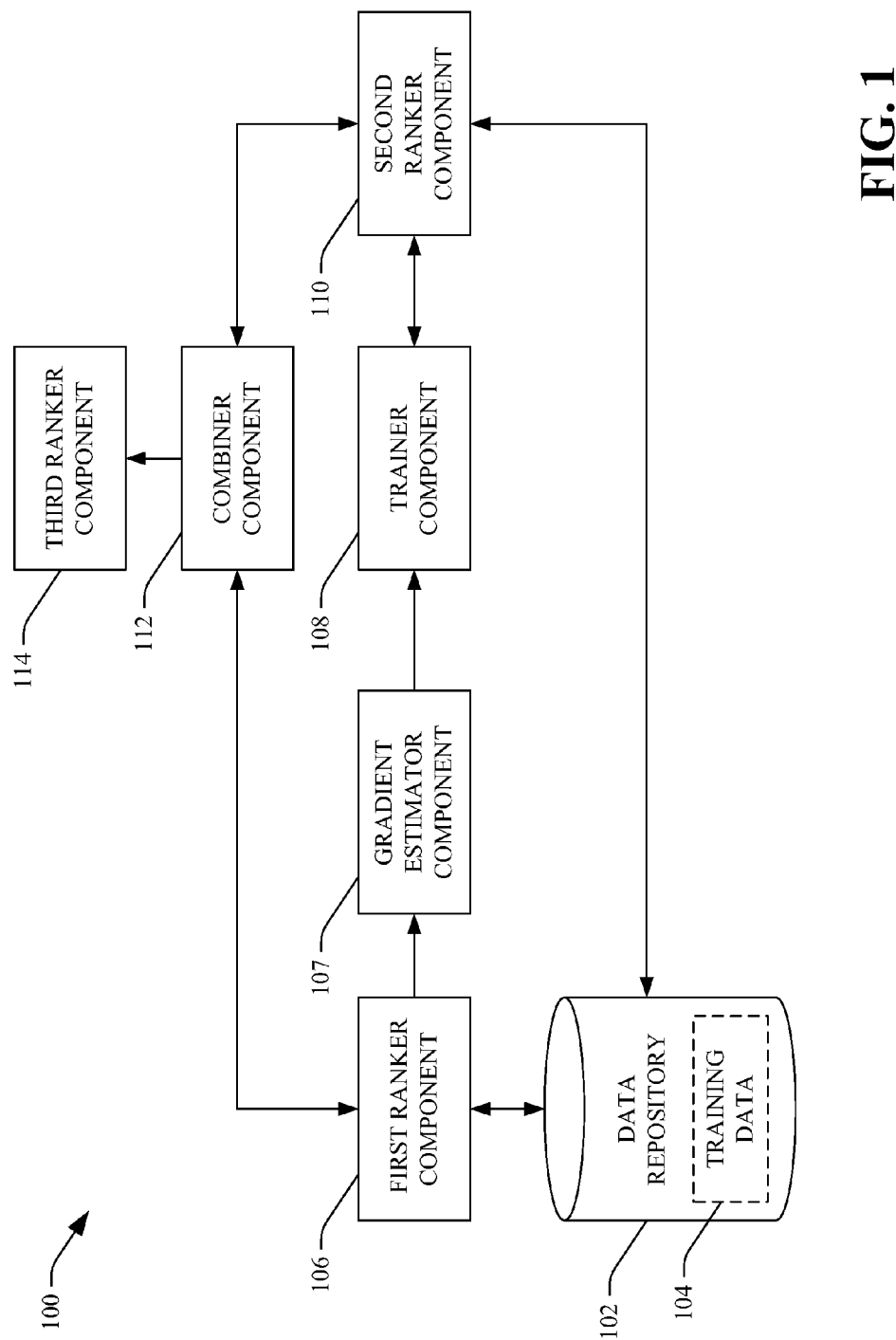
FIG. 1 is a functional block diagram of an example system that facilitates automatically building a ranker component and linearly combining the ranker component with another ranker component.

Various technologies pertaining to information retrieval will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a single component may be configured to perform functionality that is described as being carried out by multiple components.

With reference to FIG. 1, an example system 100 that facilitates training a ranking system is illustrated. The system 100 includes a data repository 102 that comprises training data 104. While shown as being a single repository, it is understood that the data repository 102 may be a distributed data store such that the training data 104 resides on several data repositories. The training data 104 may include Uniform Resource Locators (URLs), images, videos, word processing documents, or other suitable data. Data in the training data 104 may be labeled data, such that subsets of training points in the training data 104 are known to correspond to one or more queries. That is, for a particular query, identity of training points and a desired order of the training points with respect to a query are known a priori. In yet another example, training points can be assigned data that corresponds to a pair-wise comparison with other training points. For instance, data may indicate that a first document is to be ranked higher than a second document, lower than a third document, and higher than a fourth document. This type of data may be assigned to each training point in the training data 104. As a desired rank of the training data 104 is known with respect to certain queries, quality of a ranker component with respect to the training data 104 may be discerned using any suitable information retrieval metric method, such as Normalized Discounted Cumulative Gain (NDCG), Mean Average Precision (MAP), Q-measure, generalized average precision, amongst others.

The system 100 additionally includes a first ranker component 106 that receives a subset of training points in the training data 104 with respect to at least one query. As noted above, the query can be a known query, such that a desired order of items (e.g., desired order of items in the training points) is also known. The first ranker component 106 may be a ranker component that has been found to perform at a relatively high level when ranking search results, for instance. In another example, the first ranker component 106 may be a combination of two or more ranker components. The first ranker component 106 generates a score for each training point that corresponds to the query. A gradient estimator component 107 may output an estimate of a gradient of a cost (e.g., an NDCG cost) with respect to at least one training point and at least one query. For instance, the estimate of the gradient of the cost (estimated gradient) with respect to the at least one training point and the at least one query may be determined empirically. In another example, the estimated gradient may be a lambda gradient, which is described in greater detail below.

The system 100 further includes a trainer component 108 that receives the estimated gradient with respect to at least one training point and at least one query for the first ranker component 106. The trainer component 108 trains a second ranker component 110 based at least in part upon the received estimated gradient. For instance, the estimated gradient may be a target for learning. The trainer component 108 can use any suitable boosting algorithm to train the second ranker component 110. In one example, the trainer component 108 may use a Multiple Additive Regression Tree (MART) approach to build the second ranker component 110.

The system 100 further includes a combiner component 112 that linearly combines the first ranker component 106 and the second ranker component 110 to generate a third ranker component 114. In an example, the MART method can be used to linearly combine the first ranker component 106 and the second ranker component 110 to generate the third ranker component 114. In another example, the combiner component 112 can combine the first ranker component 106 and the second ranker component 110 such that the linear combination (the third ranker component 114) is optimized or substantially optimized with respect to a selected information retrieval metric method (e.g., NDCG). In more detail, the first ranker component 106 and the second ranker component 110 receive a substantially similar subset of training points with respect to a query. The first ranker component 106 individually assigns scores to each training point in the subset of training points and the second ranker component 110 individually assigns scores to each training point in the subset of training points. The first ranker component 106 and the second ranker component 110 may be linearly combined by the combiner component 112 such that the combination is optimized or substantially optimized with respect to a selected information retrieval metric method. Linearly combining two or more ranker components can be defined as linearly combining scores output by the two or more ranker components. Thus, output of the third ranker component 114 can be a linear combination of scores output by the first ranker component 106 and the second ranker component 110.

In more detail regarding estimated gradients of cost, such gradients can be generated for each item with respect to each query used to train a ranker component or ranker system. As noted above, estimated gradients may be gradients ascertained when a smooth cost function is empirically determined or lambda gradients. Estimated gradients may include other vectors, functions, numerals, or the like that are not gradients of a smooth cost function but can be used to reduce cost associated with a ranker component or system when used to train the ranker component or system. Pursuant to an example, a lambda gradient can reflect a direction an item should be moved in a ranked list of items and how "strongly" the item should be moved to reduce cost of the item, wherein cost can be determined using any suitable cost function. In another example, an estimated gradient of cost can be determined by analyzing desired movement of items in a ranked list of items (e.g., as determined through analysis of the training data 104).

The pair-wise ranking data may indicate which item between two items should be ranked higher than the other with respect to the query. Scores assigned to the same two items by the first ranker component 106 can also be used to determine which of the two items should be ranked higher than the other with respect to the query. Accordingly, if the training data 104 indicates that a first item should be ranked higher than the second item and the scores output by the first ranker component 106 indicate that the first item should be ranked higher than the second item, the gradient estimator component 107 can determine a cost for the pair of items that is relatively low. In another example, if the training data 104 indicates that the first item should be ranked higher than the second item but the scores output by the first ranker component 106 indicate that the second item should be ranked higher than the first item, then the gradient estimator component 107 can determine a relatively high cost for the pair of items.

In still more detail, the gradient estimator component 107 can analyze two different aspects when generating an estimated gradient of cost: a) a cross entropy, which is a measurement of a distribution of the training data 104 as indicated therein (e.g., whether a first item should be ranked higher than a second item) and a measurement of the distribution of scores output by the first ranker component 106; and b) a change in an indication of quality (as determined by a suitable metric, such as NDCG) if position of two documents at issue are changed. The estimated gradient of cost can be determined by analyzing the change in these two aspects (cross entropy and NDCG or other suitable metric) when parameters of the first ranker component 106 are changed. Thus, the estimated gradient of cost for training points (with respect to one or more queries) can be determined by treating ranking as a ranking problem (e.g., whether a first document should be ranked above a second document) and not as a classification problem (e.g., whether a document should be classified as "good", "fair", or "poor").

With respect to lambda gradients, generation of lambda gradients is described in United States Patent Application No. 2007/0094171, filed on Dec. 16, 2005, and entitled TRAINING A LEARNING SYSTEM WITH ARBITRARY COST FUNCTIONS, the entirety of which is incorporated herein by reference. Generation of lambda gradients is additionally described in the following publication: C. J. C. Burges, R. Ragno and Q. V. Le, "*Learning to Rank with Non-Smooth Cost Functions*", Neural Information Processing Systems Conference 2006, the entirety of which is incorporated herein by reference.

Pursuant to a particular example, the gradient estimator component 107 can use NDCG as a mechanism for determining a cost associated with the first ranker component 106 with respect to at least one query and scores assigned to labeled data by the first ranker component 106. For instance, for a given query $Q_i$, NDCG, denoted here by $N_i$, can be computed by the gradient estimator component 107 using the following formula:

$$N_i = N_i \Sigma_{j=1}^{L} (2^{r(j)} - 1)/\log(1+j),$$

where $r(j)$ is a relevance level of a document in position j in a ranked document order, and L is a ranking level at which the NDCG is computed. The normalization constant $N_i$ is chosen such that a perfect ordering of documents would result in $N_i = 1$. The $N_i$ can be averaged over a query set to determine an NDCG. Other cost metrics are also contemplated, such as pair-wise error counts and a winner-take-all metric.

As noted above, approximations of cost functions have been employed when training ranker components or systems as such cost functions are often not differentiable. Often, however, an approximate cost function does not reflect desired behavior of a ranker component or system. As described in United States Patent Application No. 2007/0094171, a set of proposed gradients (herein referred to as "lambda gradients") that correspond to items scored and ranked by the first ranker component 106 can be generated. The lambda gradient for each item can reflect the direction that the item should move within a ranking in order to reduce the cost and can further indicate how "strongly" the item should be moved. The gradient estimator component 107 can generate lambda gradients based at least in part upon a desired order of items with respect to one or more queries and an order of items as output by the first ranker component 106. Pursuant to an example, a lambda gradient can be applied to an item based upon a set of rules that reflect one or more requirements of a corresponding cost function. These lambda gradients may be stored, for example, for use in training the second ranker component 110.

In another example, the gradient estimator component 107 can empirically determine a smooth cost function, and can further determine estimated gradients based at least in part upon the smooth cost function. That is, for several queries, parameters of the first ranker component 106 can be altered, costs for training points can be determined, and quality metrics with respect to training points can be determined. Thus, an estimate of the gradient of the cost with respect to each training point can be determined empirically. To generate a single estimate of a gradient of a cost for a combination of training points for the first ranker component 106, the estimates of gradients of costs with respect to individual training points can be averaged.

The use of the estimates of estimated gradients (which include lambda gradients and empirically estimated gradients) allows certain boosting algorithms to be used in connection with pre-existing ranker components. Furthermore, different types of machine learning techniques/systems may be combined. For example, the first ranker component 106 may be or include a neural network, and a regression tree may be trained by the trainer component 108 and linearly combined with the first ranker component 106 by the combiner component 112. In an example, MART may be used to train a regression tree that is to be combined with the first ranker component 106. It is to be understood, however, that any suitable boosting algorithm that can train ranker components (e.g., in the form of regression trees, support vector machines, neural networks, . . . ) based upon estimated gradients of cost may be employed. Thus, the second ranker component 110 may be a regression tree, a neural network, a support vector machine, or the like.

The second ranker component 110 may then be weighted, such that scores output by the second ranker component 110 are altered by a selected weight w. Weighted scores may then be linearly combined with scores output by the first ranker component 106. For instance, scores output by the first ranker component 106 for items in the training data 104 may be denoted as $s_1$ and scores output by the second ranker component 110 may be denoted as $s_2$. If scores output by the second ranker component 110 are weighted by the parameter w, then a final score $s_F$ output by the linear combination of the first ranker component 106 and the second ranker component 110 is $s_1 + ws_2$. Other linear combinations are also contemplated. For instance, influence of scores output by the first ranker component 106 may be lessened as influence of scores output by the second ranker component 110 increases. In an example, the final score s may be equal to $(1-w)s_1 + ws_2$.

The combiner component 112 can linearly combine the first ranker component 106 and the second ranker component 110 to create the third ranker component 114 such that the linear combination is optimized or substantially optimized with respect to an information retrieval metric method. In other words, the combiner component 112 can select a value for w that is used to linearly combine the first ranker 106 and the second ranker component 110. The selection of w by the combiner component 112 is described in detail below.

Once the first ranker component 106 and the second ranker component 110 have been combined to create the third ranker component 114, the gradient estimator component 107 can determine an estimated gradient of a cost for the third ranker component 114, and another ranker component can be trained by the trainer component 108. Therefore, the system 100 facilitates iteratively creating ranker components and combining ranker components to improve upon an existing ranker component (which may be a combination of ranker components). The iterative process can continue, for instance, until a combined ranker component performs as desired.

Figure 2:
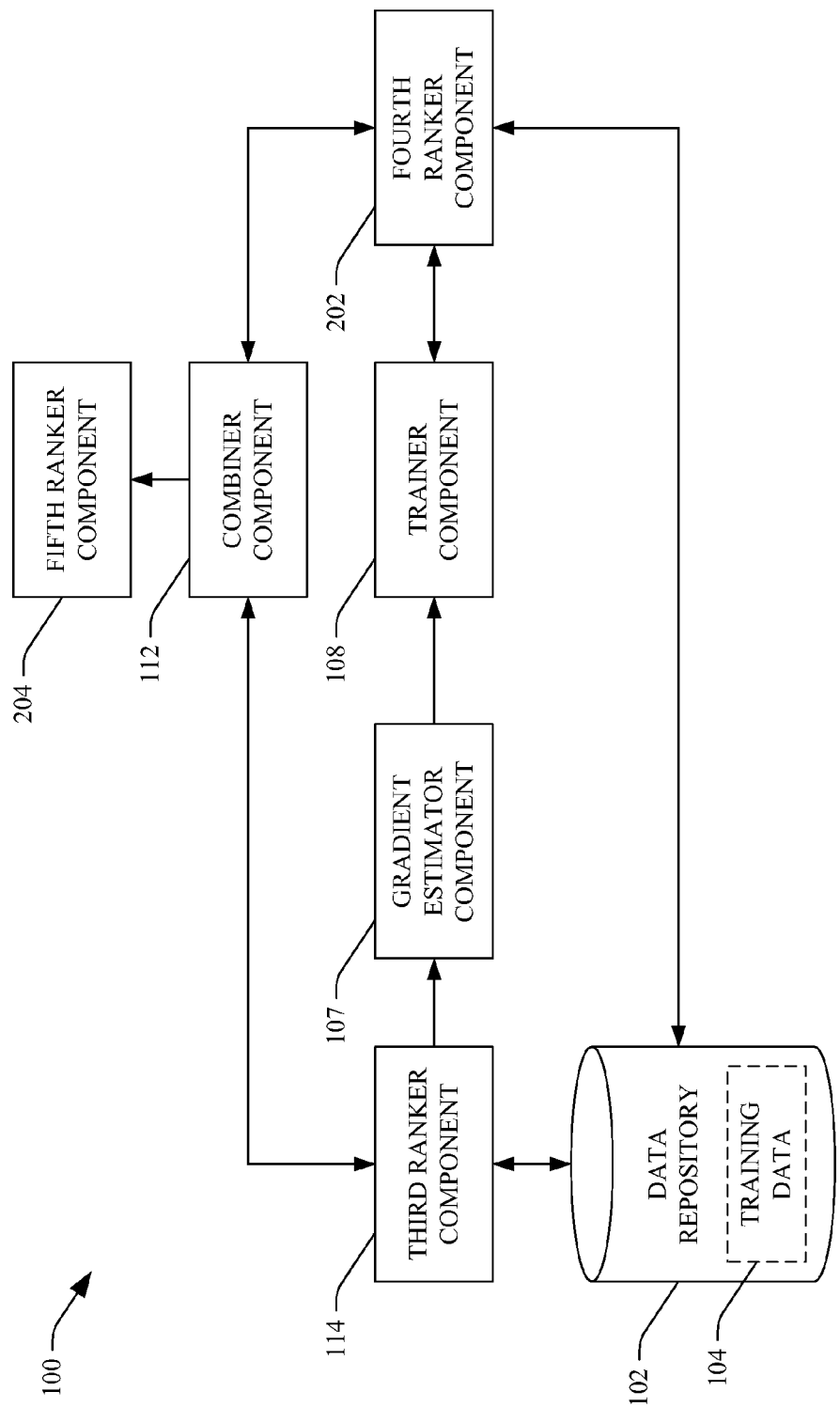
FIG. 2 is a functional block diagram of an example system that facilitates automatically building a ranker component and linearly combining the ranker component with another ranker component.

Referring now to FIG. 2, an example system 200 that facilitates combining ranker components is illustrated. The system 200 includes the data repository 102 that comprises the training data 104, the gradient estimator component 107, the trainer component 108, and the combiner component 112, which act in conjunction as described above. In this example, the third ranker component 114 (e.g., the linear combination of the first ranker component 106 and the second ranker component 110) receives training data that corresponds to a query and outputs scores for training points in the training data. The gradient estimator component 107 receives the scores and generates at least one estimated gradient of cost for the third ranker component 114. The trainer component 108 can train a fourth ranker component 202 based at least in part upon the estimated gradient of cost. The combiner component 112 can linearly combine the third ranker component 114 with the fourth ranker component 202 to create a fifth ranker component 204 (which is a linear combination of the third ranker component 114 (which is a linear combination of the first ranker component 106 and the second ranker component 110) and the fourth ranker component 202.

Figure 3:
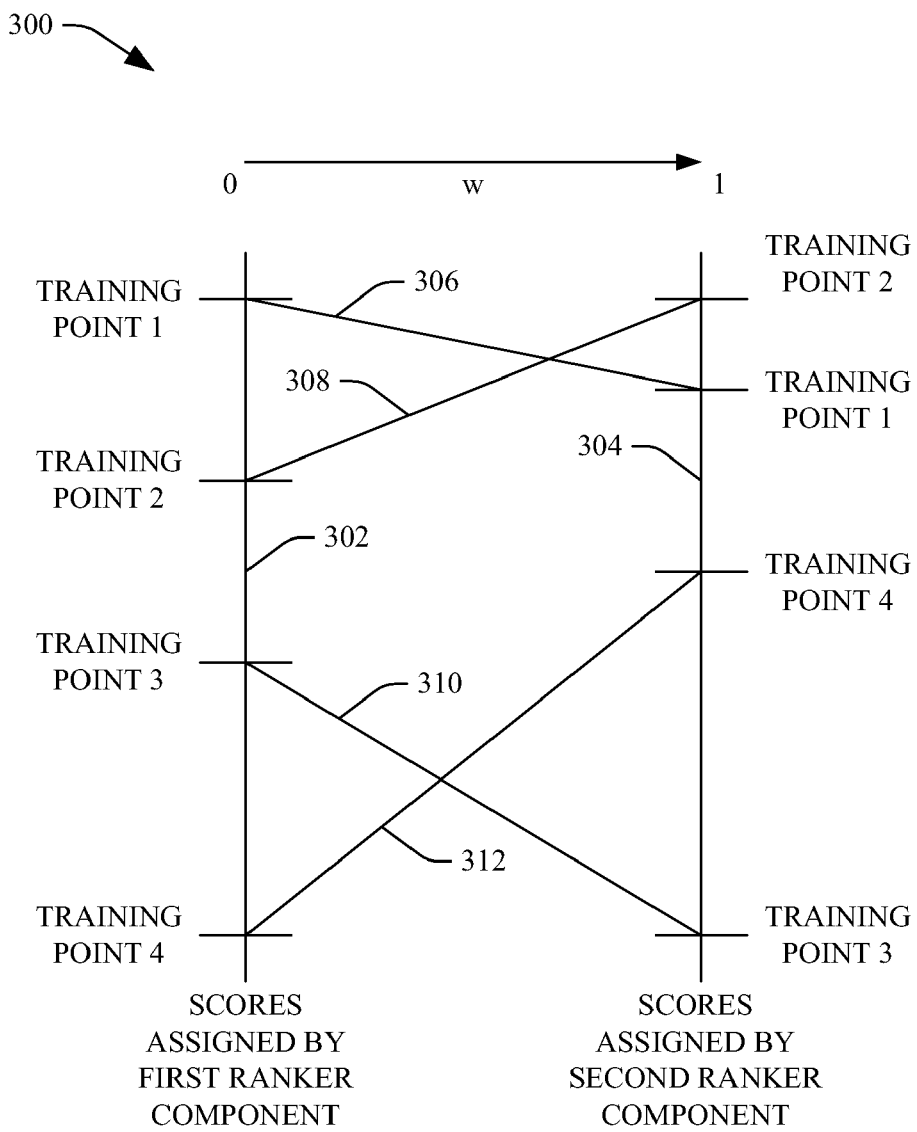
FIG. 3 is an example illustration of scores assigned to search items by two ranker components.

Now referring to FIG. 3, an example illustration 300 that graphically depicts scores assigned to training points by the first ranker component 106 and the second ranker component 110 is provided. The illustration 300 includes a first vertical line 302 that represents scores that may be assigned to search results by the first ranker component 106 with respect to a query and/or user. The illustration 300 additionally includes a second vertical line 304 that represents scores that may be assigned to search results by the second ranker component 110 with respect to the query and/or user.

In this example illustration 300, the first ranker component 106 has assigned a first training point a highest score, a second training point a second highest score, a third training point a third highest score, and a fourth training point a fourth highest score. The second ranker component 110 has assigned the second training point the first highest score, the first training point the second highest score, the fourth training point the third highest score, and the third training point the fourth highest score.

To determine a value for w that causes the linear combination of the first ranker component 106 and the second ranker component 110 to be optimized or substantially optimized for a given information retrieval metric method, values for w can be ascertained that cause a pair of search results to be scored equally when the first ranker component 106 and second ranker component 110 are linearly combined. This is graphically depicted as being the locations where lines corresponding to training points intersect. For instance, if a linear combination of the first ranker component 106 and the second ranker component 110 is undertaken such that a final score s is $s_1(w-1)+ws_2$, then the vertical line 302 corresponds to where w is zero and the vertical line 304 corresponds to where w is one. It is to be understood, however, that any suitable manner for linearly combining ranker components can be undertaken. A line 306 indicates how the score for the first training point changes as a value of w increases, a line 308 indicates how the score for the second training point changes as a value of w increases, a line 310 indicates how the score for the third training point changes as a value of w increases, and a line 312 indicates how the score for the fourth training point changes as a value of w increases. With respect to the example illustration 300, then, it is desirable to determine where the lines 306 and 308 intersect and where the lines 310 and 312 intersect. As noted above, however, every value of w can be determined that causes a pair of search results to have an equal score when ranker components are linearly combined.

These values of w can then be used to determine a value for w that results in an optimal or substantially optimal linear combination of the first ranker component 106 and the second ranker component 110 with respect to a given information retrieval metric method. For instance, an information retrieval metric method may be used to determine a quality metric for the linear combination of the first ranker component 106 and the second ranker component 110 when the value of w is zero. The quality metric may be discerned through use of any suitable method. A value of w may then be selected that is illustrated graphically as being between the intersection of lines 310 and 312 and the intersection of lines 306 and 308. A change in the quality metric (or a new quality metric) may be determined by using this value of w to linearly combine the first ranker component 106 and the second ranker component 110. In an example, a value for w can be chosen as a midpoint between the intersection of lines 310 and 312 and the intersection of lines 306 and 308. It is to be understood, however, that any suitable value of w between the two aforementioned intersections can be selected and used to linearly combine the first ranker component 106 and the second ranker component 110.

Thereafter, a value of w can be selected that is illustrated graphically as being larger than the value of w at the intersection of lines 306 and 308, and a change in the quality metric (or a new quality metric) can be computed using this value of w to linearly combine the first ranker component 106 and the second ranker component 110. The value of w that corresponds to where the quality metric is determined to be optimal or substantially optimal may then be selected for use when linearly combining the first ranker component 106 and the second ranker component 110. While the analysis has been described with respect to values of w moving from a lower value to a relatively higher value, it is understood that the analysis can be undertaken in the reverse. That is, the analysis can begin with a relatively higher value for w and proceed towards a relatively lower value for w.

The example illustrated in FIG. 3 and described above relates to a case where two ranker components are linearly combined with respect to a single query. It can be discerned, however, that multiple sets of training points corresponding to multiple queries can be used to determine a value for w to be used to linearly combine the first ranker component 106 and the second ranker component 110. This can be done by computing all values of w for which any pair of lines cross, for all such diagrams, and then examining the so-enumerated values of w in order to determine all possible values that the information retrieval metric can take, for any such linear combination of rankers. Alternatively, rankers can be combined iteratively. For instance, it may be desirable to combine four rankers. First, an optimal or substantially optimal linear combination of first and second rankers can be determined as described above. Thereafter, the combined first and second rankers can be treated as a fixed ranker (1-2), and can be optimally or substantially combined with a third ranker (1-2-3). The combined ranker (1-2-3) may then be optimally or substantially optimally combined with a fourth ranker (1-2-3-4). Thereafter, a different combination of rankers (e.g., 2-3-4) can be optimally or substantially optimally combined with the first ranker, then a different combination (e.g., 3-4-1) can be optimally or substantially optimally combined with a different ranker (e.g., 2), until the process converges to a fixed solution.

Furthermore, an instance may arise where, when the first ranker component 106 and the second ranker component 110 are linearly combined, a value of w causes three or more search results to be scored equally. Depicted graphically, three or more lines corresponding to three or more search results may intersect at a same point. If this circumstance occurs, scores corresponding to the search results may be slightly modified, thereby causing a value of w to only cause a pair of search results to be scored equally when the first ranker component 106 and the second ranker component 110 are linearly combined. In another example, values of w that cause three or more search results to be scored equally when the first ranker component 106 and the second ranker component 110 are linearly combined can be identified. Thereafter, every possible different ranking with respect to the three or more search results can be analyzed and an information retrieval metric can be generated for the different possible rankings, where a ranking is an ordering of search results. Linear combination of rankers is described in detail in U.S. patent application Ser. No. 11/975,518, filed on Oct. 19, 2007, and entitled "LINEAR COMBINATION OF RANKERS", the entirety of which is incorporated herein by reference.

Figure 4:
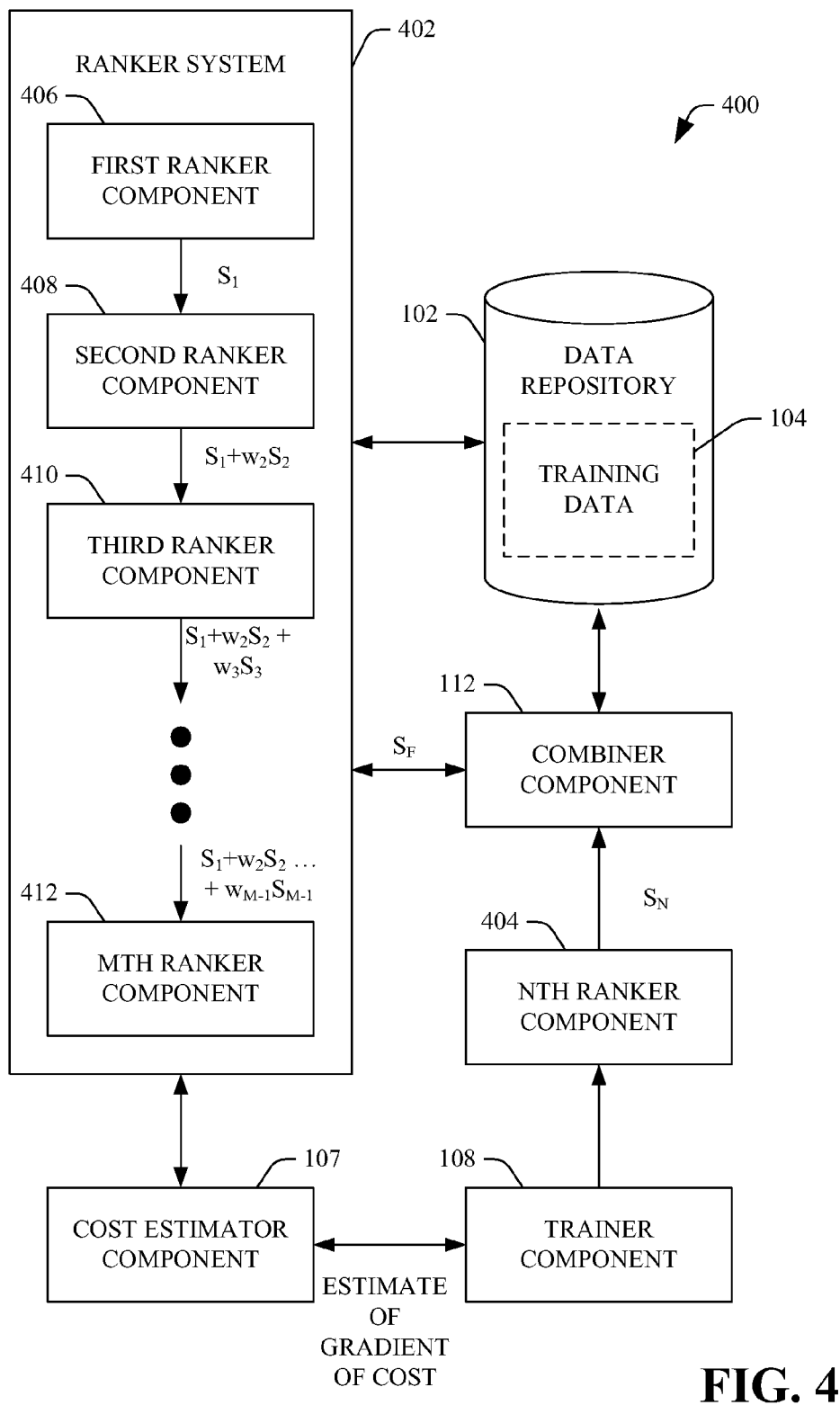
FIG. 4 is a functional block diagram of an example system that facilitates automatically building a ranker component and linearly combining the ranker component with another ranker component.

Now referring to FIG. 4, an example system 400 that facilitates iteratively combining ranker components is illustrated. The system 400 includes the data repository 102 with the training data 104 retained therein. A ranker system 402, which includes a plurality of ranker components, receives training points from the training data 104 that correspond to one or more queries. As described above, in an example, the gradient estimator component 107 can output an estimated gradient of cost based at least in part upon scores output by the ranker system 302 and labels in the training data 104 (e.g., data that indicates how items are desirably ranked with respect to certain queries). Each item/query pair may be assigned an estimated gradient of cost, which may be a lambda gradient or an empirically estimated gradient.

The trainer component 108 receives the estimated gradient and builds an Nth ranker component 404 based at least in part upon the received estimated gradient of cost. For instance, the trainer component 108 may use the estimated gradient as a target for learning. Pursuant to a particular example, the trainer component 108 may use a MART boosting algorithm to train the Nth ranker component 404, such that the Nth ranker component 404 is a regression tree. Other boosting algorithms, however, are contemplated and are intended to fall under the scope of the hereto-appended claims.

The combiner component 112 combines the Nth ranker component 404 and the ranker system 402, such that the Nth ranker component 404 is included in the ranker system 402. For instance, the combiner component 112 receives scores for a plurality of training points with respect to a plurality of queries from the ranker system 402. Additionally, the combiner component 112 receives scores for the plurality of training points with respect to the plurality of queries from the Nth ranker component 404. The combiner component 112 may then use a desirable information retrieval metric method to linearly combine the ranker system 402 and the Nth ranker component 404 such that the linear combination is optimized or substantially optimized with respect to the desirable information retrieval metric method.

With more detail regarding the ranker system 402, such ranker system 402 includes several ranker components. Specifically, the ranker system 402 includes a first ranker component 406, a second ranker component 408, a third ranker component 410, and an Mth ranker component 412. In an example, a training point that corresponds to a query is assigned a score $s_1$ by a first ranker component 406, a score $s_2$ by the second ranker component 408, a score $s_3$ by the third ranker component 410, and a score $s_M$ by the Mth ranker component 412. The score $s_1$ is linearly combined with the score $s_2$. More specifically, the second ranker component 408 is weighted such that the score $s_2$ is modified by a weight $w_2$. Accordingly, the resultant score for the training point generated by the linear combination of the first ranker component 406 and the second ranker component 408 is $s_1+w_2 s_2$. The third ranker component 410 is weighted such that the score $s_3$ is modified by a weight $w_3$. This modified score is then added to $s_1+w_2 s_2$, such that the modified score is $s_1+w_2 s_2+w_3 s_3$. This pattern continues through the Mth ranker 412, such that the final score generated by the ranker system 402 is $s_1+w_2 s_2 \ldots + \ldots w_M s_M$. After the ranker system 402 is combined with the Nth ranker component 404, the output of the ranker system 402 (which includes the Nth ranker component 404) will be $s_1+w_2 s_2 \ldots + \ldots w_M s_M+w_N s_N$. Alternatively, the iterative process described above may be applied.

Figure 5:
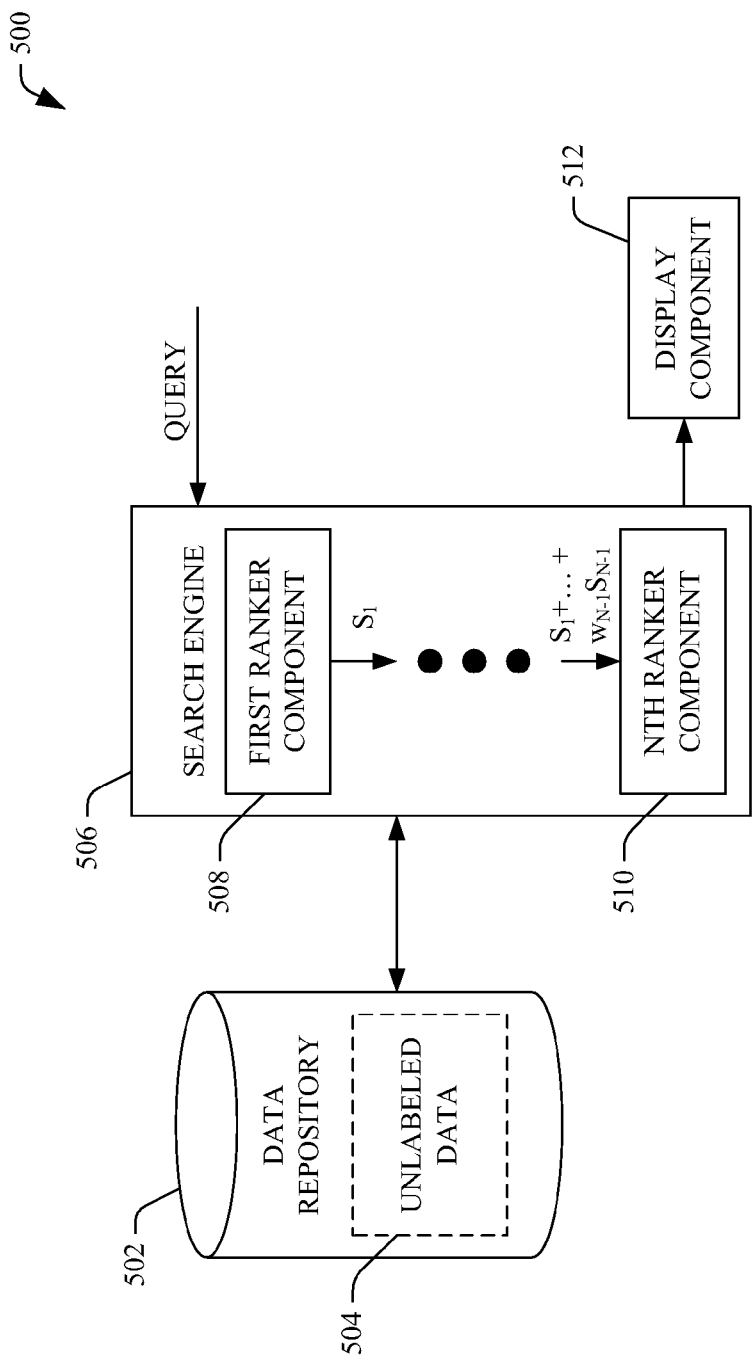
FIG. 5 is a functional block diagram of an example search engine.

Now referring to FIG. 5, an example system 500 that facilitates outputting a ranked list of search results is illustrated. The system 500 includes a data repository 502 that retains unlabeled data 504. For instance, the unlabeled data may include URLs that are accessible by way of the Internet. Of course, other types of items may be included in the unlabeled data.

A search engine 506 receives a query and searches the data repository 502 for items in the unlabeled data 504 that correspond to the query. The search engine 506 includes a plurality of ranker components that are used to assign scores to items that are found to correspond to the query, such that the items may be ranked in accordance with the scores. Specifically, the search engine includes a first ranker component 508 through an Nth ranker component 510. In an example, the first ranker component 508 may be a baseline ranker component that is linearly combined with a second ranker component (not shown) that has been trained through use of a boosting algorithm while using an estimated gradient of cost as a target for training/learning. An estimated gradient of cost may be generated for the combination of the first and second ranker components and can be used to train a third ranker component, which may then be linearly combined with the combination of the first and second ranker components. Such process may continue iteratively.

As alluded to above, a final score output by the combination of ranker components for an item that corresponds to the query can be denoted $s_F=s_1+ \ldots +s_N w_N$, where $s_F$ is a final score assigned to an item, $s_1$ is a score assigned to the item by the first ranker component 508, $s_N$ is a score assigned to the item by the Nth ranker component 510, and $w_N$ is a weight used to modify scores output by the Nth ranker component 510. Each item is assigned a final score, and thus scored items can be ranked in accordance with the assigned final scores. The search engine 506, therefore, can output search results that are ranked in accordance with an estimated relevance with respect to the query and/or user that issued the query.

The system 500 further includes a display component 512 that facilitates display of the search results to the user. The display component 512 may reside on a server and may be used to generate display data that can be displayed on a client. In another example, the display component 512 may be or reside on a client. For instance, the display component 512 may be display screen, a thread of execution that facilitates display of data on a display screen, or the like.

With reference now to FIGS. 6-9, various example methodologies are illustrated and described. While the methodologies are described as being a series of acts that are performed in a sequence, it is to be understood that the methodologies are not limited by the order of acts in the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like.

Figure 6:
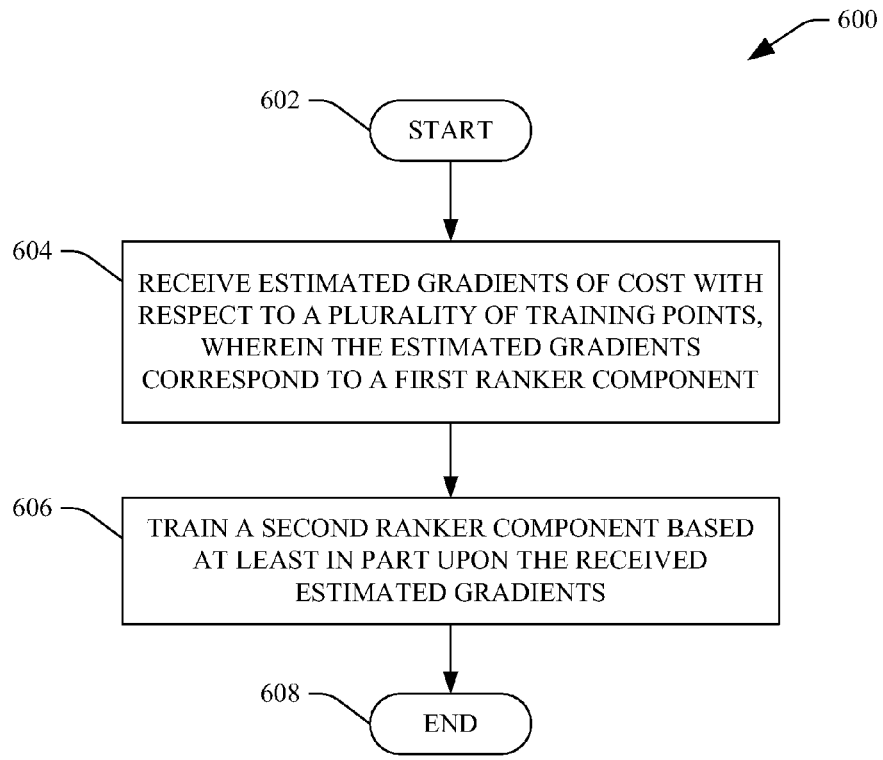
FIG. 6 is a flow diagram that illustrates an example methodology for boosting a ranker component.

Referring specifically to FIG. 6, an example methodology 600 for building a ranker (e.g., through use of a boosting algorithm) is illustrated. The methodology 600 starts at 602, and at 604 estimated gradients of cost are received with respect to a plurality of training points (e.g., labeled items), wherein the estimated gradients of cost correspond to a first ranker component. For example, the first ranker component may be a baseline ranker component that is configured to output scores for items with respect to one or more queries, wherein the scores can be used to rank the items. Moreover, the estimated gradients of cost may be lambda gradients. In yet another example, the estimated gradients of cost may be empirically estimated gradients.

At 606, a second ranker component is trained based at least in part upon the received estimate of the gradient of the cost. The estimated gradients, for instance, may be used as a target for a boosting algorithm when such boosting algorithm trains a second ranker component that is to be linearly combined with the first ranker component. In an example, the boosting algorithm may be an algorithm that corresponds to MART. Other boosting algorithms, however, are also contemplated. The methodology 600 then completes at 608.

Figure 7:
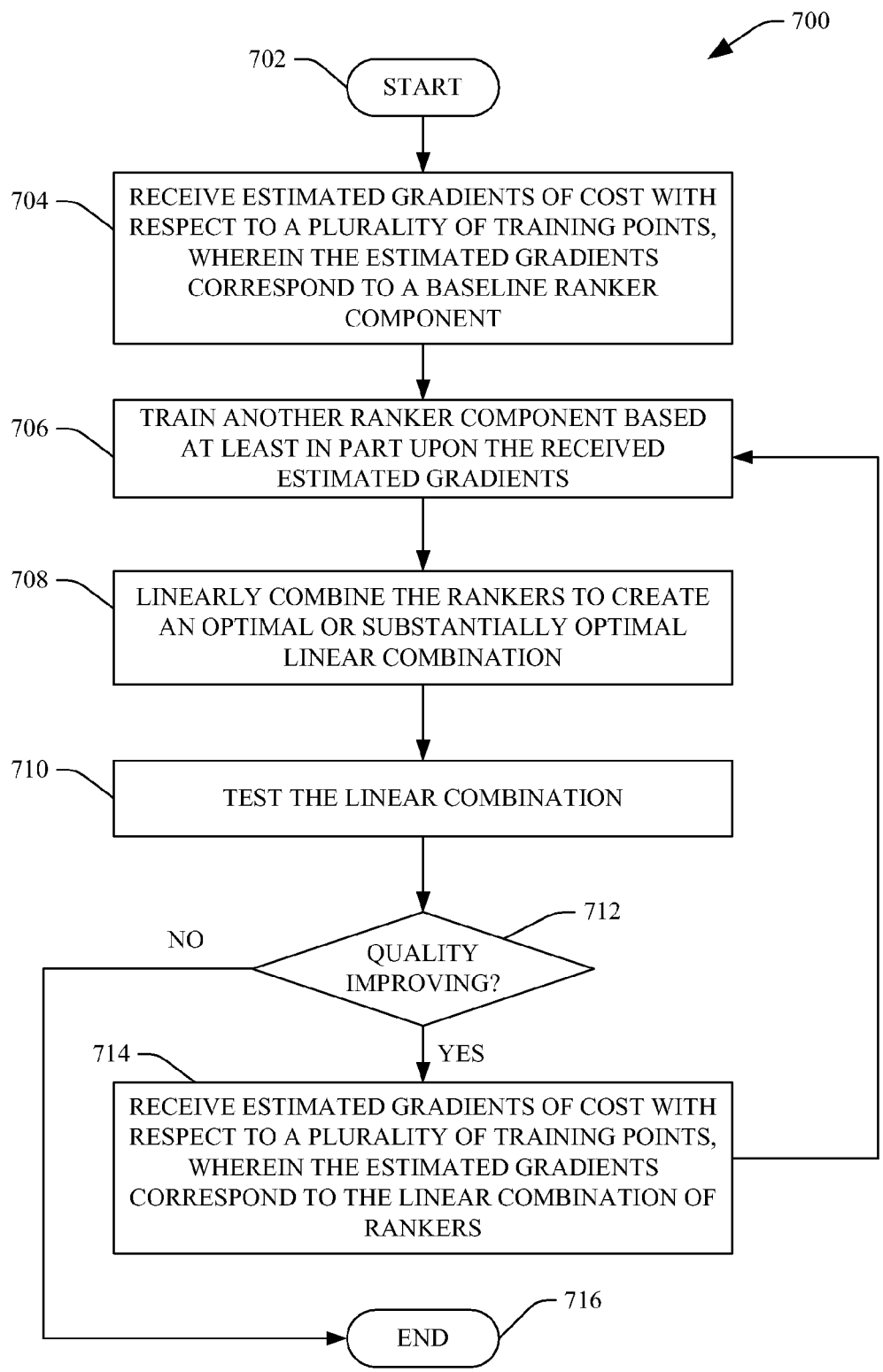
FIG. 7 is a flow diagram that illustrates an example methodology for iteratively boosting a ranker component.

Referring now to FIG. 7, a methodology 700 for iteratively building ranker components and linearly combining ranker components is illustrated. The methodology 700 starts at 702, and at 704 estimated gradients with respect to a plurality of training points and a baseline ranker component is received. At 706, another ranker component is trained based at least in part upon the received estimated gradients. For instance, the baseline ranker component may be a neural network ranker component and the trained ranker component may be a regression tree ranker component. Other kinds of ranker components are also contemplated.

At 708, the ranker components are linearly combined to create an optimal or substantially optimal linear combination of ranker components with respect to a selected information retrieval metric method (e.g., NDCG). At 710, the linear combination is tested to determine if a quality metric of the combined ranker components has improved when compared to previous combinations. In another example, the linear combination may be tested at 710 to determine if the cost corresponding to the combination of ranker components has decreased when compared to costs of previous rankers. Other manners for testing the linear combination are also contemplated and are intended to fall under the scope of the hereto-appended claims.

At 712, a determination is made regarding whether the quality of the linear combination has improved when compared to previous combinations of ranker components. If the quality has improved, then it may be desirably to train an additional ranker component and linearly combine such trained ranker component with the existing linear combination of ranker components. Accordingly, if the quality is determined to have improved at 712, then at 714 estimated gradients of cost with respect to a plurality of training points is received, wherein the estimate corresponds to the linear combination of ranker components (created at 608). The method then returns to act 706. If it is determined that the quality of the linear combination has not improved, then the method completes at 716.

Figure 8:
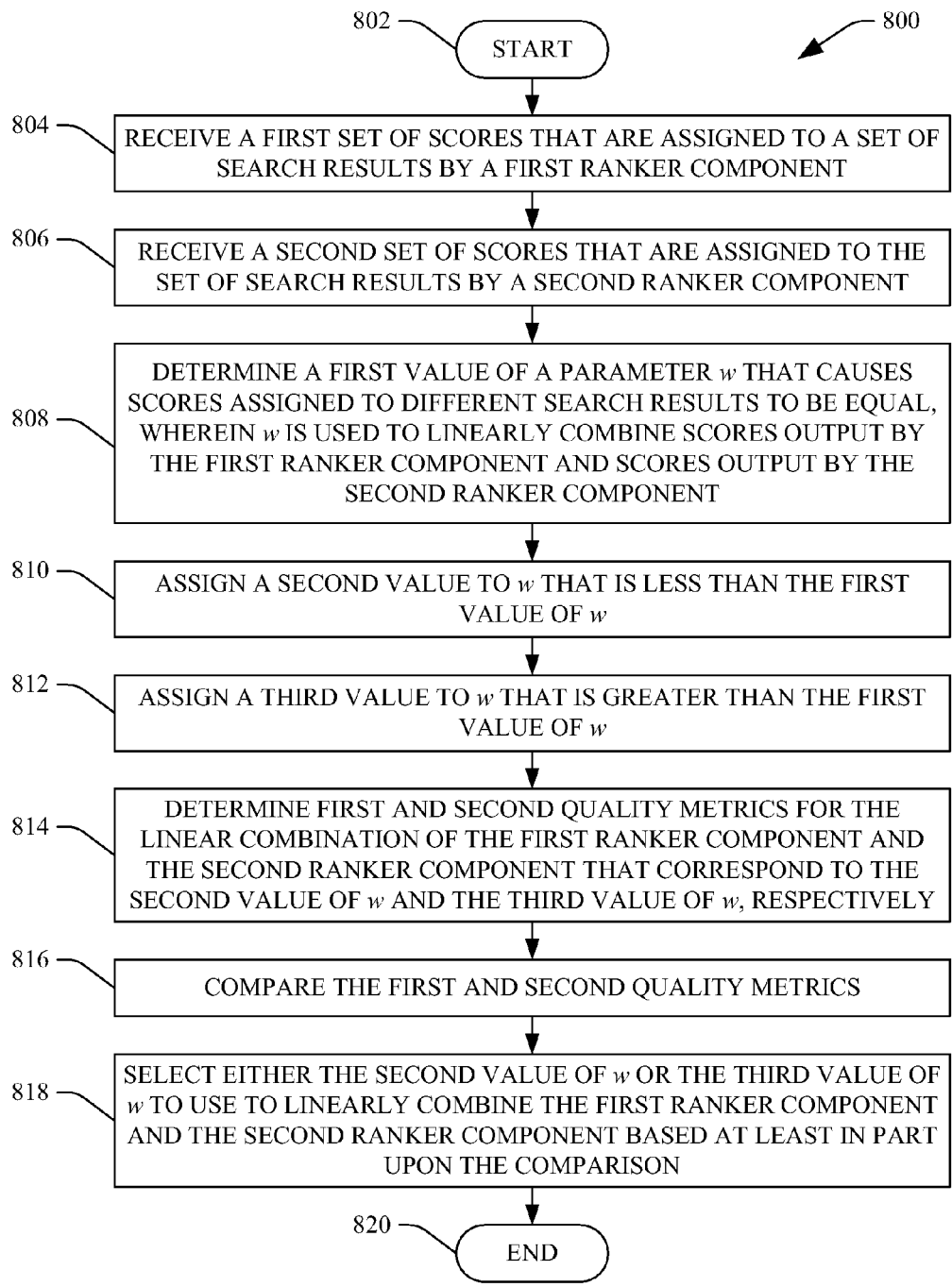
FIG. 8 is a flow diagram that illustrates an example methodology for linearly combining two ranker components.

Referring now to FIG. 8, an example methodology 800 for linearly combining at least two ranker components is illustrated. The methodology 800 starts at 802, and at 804 a first set of scores that are assigned to a set of training points by a first ranker component is received. At 806, a second set of scores that are assigned to the set of training points by a second ranker component is received.

At 808, a first value of a parameter w that causes scores assigned to different search results to be equal is determined, wherein w is used to linearly combine scores output by the first ranker component and scores output by the second ranker component.

At 810, a second value is assigned to w that is less than the first value of w. At 812, a third value is assigned to w that is greater than the first value of w. At 814, first and second quality metrics for the linear combination of the first ranker component and the second ranker component are determined, wherein the first and second quality metrics correspond to the second and third values of w, respectively.

At 816, the first and second quality metrics are compared, and at 818 either the second value of w or the third value of w is selected to linearly combine the first ranker component and the second ranker component, wherein the selection is based at least in part upon the comparison of 816. The methodology 800 then completes at 820.

Figure 9:
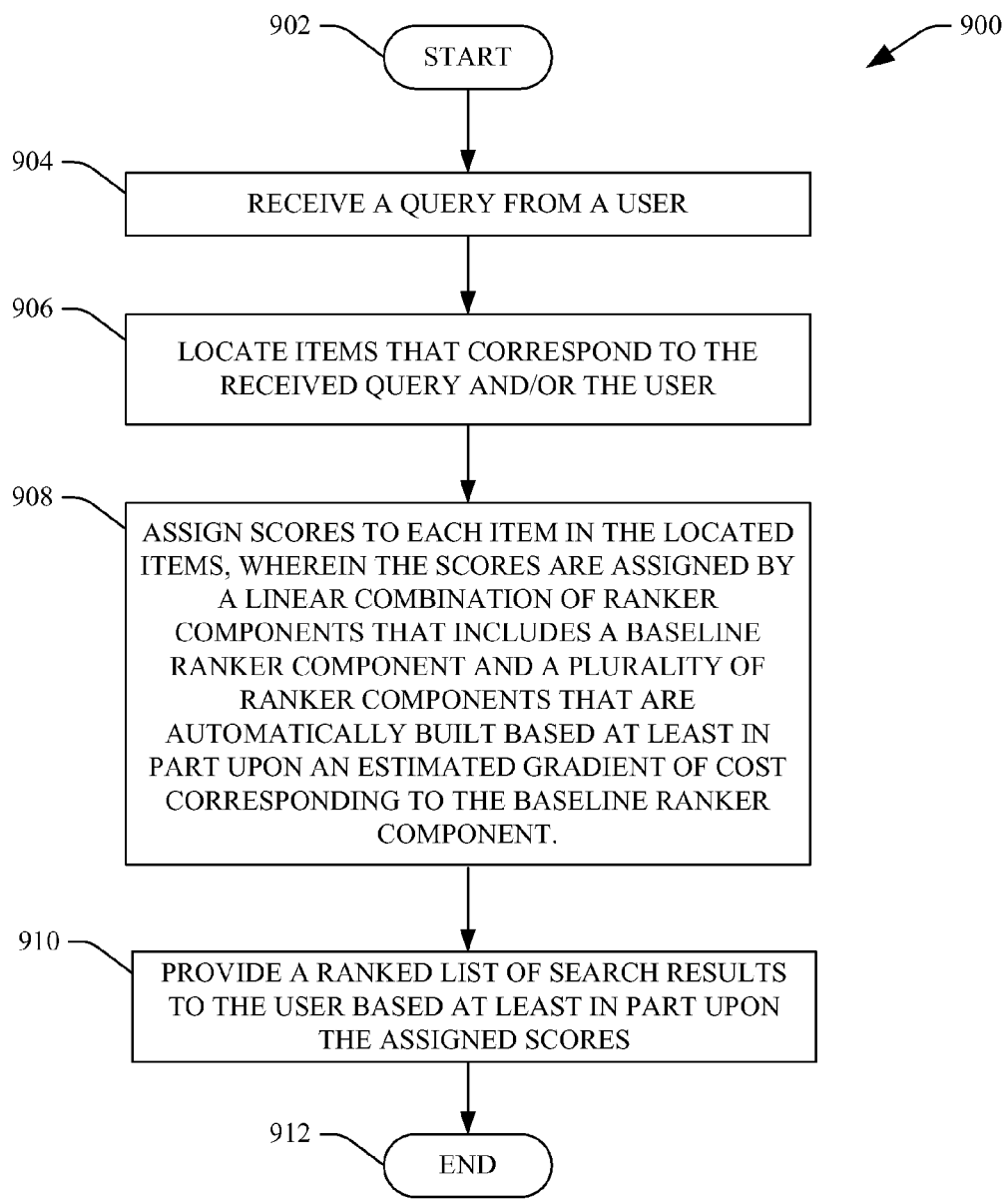
FIG. 9 is a flow diagram that illustrates an example methodology for using a boosted ranker component in a search engine.

Turning now to FIG. 9, an example methodology 900 for providing a user with a ranked list of search results it illustrated. The methodology 900 starts at 902, and at 904 a query is received from a user. At 906, items are located that correspond to the received query and/or the user. For instance, the items may include URLs that are searched over by a search engine. In another example the items may include documents resident upon a computer hard drive. In yet another example, the items may include automated answers to frequently asked questions. Other suitable types of items not explicitly disclosed herein are also contemplated and are intended to fall under the scope of the hereto-appended claims.

At 908, scores are assigned to each item in the located items. The scores are assigned by a linear combination of ranker components. The linear combination of ranker components includes a baseline ranker component and at least one other ranker component that is automatically trained based at least in part upon an estimate of a gradient of a cost that corresponds to the baseline ranker component. At 910, a ranked list of search results is provided to the user based at least in part upon the assigned scores. The methodology 900 then completes at 912.

Figure 10:
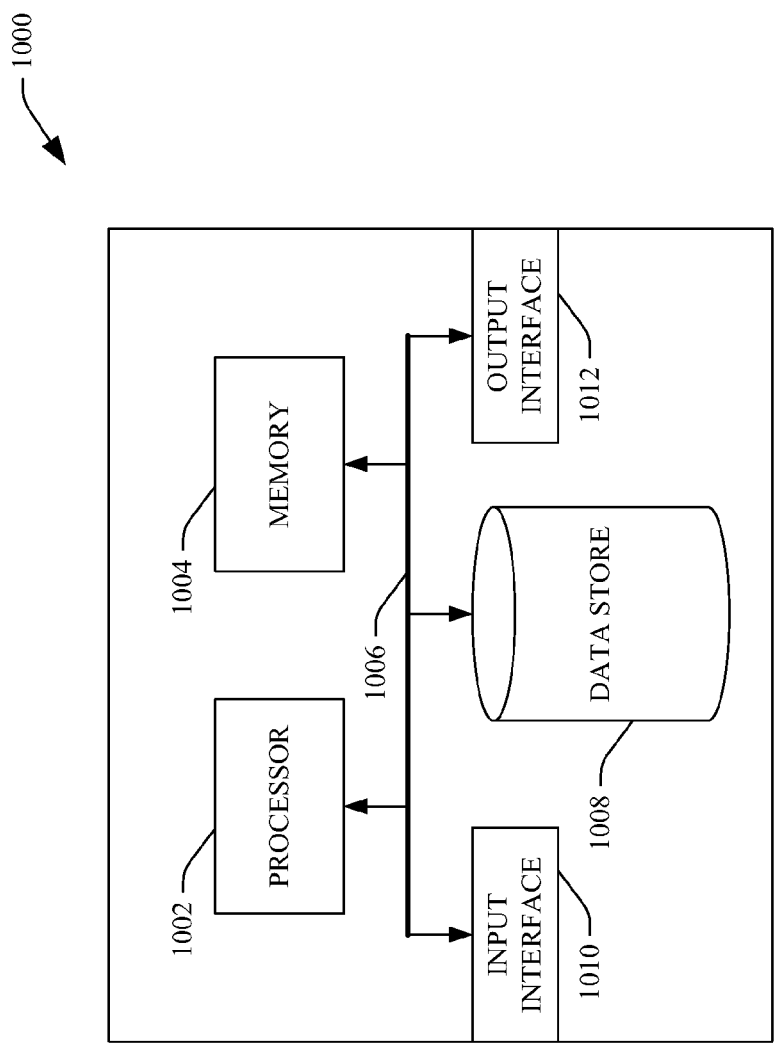
FIG. 10 is an example computing system.

Now referring to FIG. 10, a high-level illustration of an example computing device 1000 that can be used in accordance with the systems and methods disclosed herein is illustrated. For instance, the computing device 1000 may be used in an information retrieval context. The computing device 1000 can be used in a conventional server setting, or may be employed in devices that are conventionally thought of as client devices, such as personal computers, personal digital assistants, and the like. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory by way of a system bus 1006. In addition to storing executable instructions, the memory 1004 may also store identities of search results, scores associated with search results, values for parameters, and the like.

The computing device 1000 additionally includes a data store 1008 that is accessible by the processor 1002 by way of the system bus 1006. The data store 1008 may include searchable items, labeled data (training points), and other suitable data. The computing device 1000 also includes an input interface 1010 that allows external devices and/or individuals to communicate with the computing device 1000. For instance, the input interface 1010 may be used to receive a query from a user. The computing device 1000 also includes an output interface 1012 that interfaces the computing device 1000 with one or more external devices. For example, the computing device 1000 may provide an ordered list of search results to a client by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   at a computing device that comprises a processor and memory, receiving estimated gradients of a cost with respect to a plurality of training points, wherein the estimated gradients of the cost correspond to a first ranker;
   causing the processor to train a second ranker based at least in part upon the received estimated gradients; and
   linearly combining the first ranker with the second ranker to generate a linear combination of the first ranker and the second ranker, wherein the linear combination of the first ranker and the second ranker is of the form $s_F = s_1 + ws_2$, wherein $s_F$ is a final score for a training point with respect to a query output by the linear combination, $s_1$ is a score for the training point with respect to the query output by the first ranker, $s_2$ is a score for the training point with respect to the query output by the second ranker, and w is a weight used to modify scores output by the second ranker, wherein w is computed to optimally linearly combine the second ranker with the first ranker with respect to an information retrieval metric method, and wherein computing w comprises:
   receiving first scores for a plurality of training points, wherein each training point in the plurality of training points is individually assigned a score by the first ranker; and
   receiving second scores for the plurality of training points, wherein each training point in the plurality of training points is individually assigned a score by the second ranker, wherein w is computed based at least in part upon the first scores and the second scores.

2. The method of claim 1, wherein the estimated gradients include at least one lambda gradient.

3. The method of claim 1, wherein the estimated gradients include at least one empirically estimated gradient.

4. The method of claim 1, wherein training the second ranker comprises using a boosting algorithm to train the second ranker.

5. The method of claim 4, wherein the boosting algorithm is a Multiple Additive Regression Tree algorithm.

6. The method of claim 1, further comprising using a linear combination of the first ranker component and the second ranker component in a search engine.

7. The method of claim 1, wherein the first ranker is a neural network and the second ranker is a regression tree.

8. The method of claim 1, wherein the received estimated gradients of cost are utilized as a target for learning when training the second ranker.

9. A system, comprising:
   a processor; and
   a memory that comprises a plurality of components that are executable by the processor, the components comprising:
   a trainer component that receives an estimated gradient of cost that corresponds to a first ranker with respect to at least one training point and at least one query, wherein the trainer component trains a second ranker based at least in part upon the received estimated gradient; and
   a combiner component that linearly combines the first ranker and the second ranker to create a linear combination of the first ranker and the second ranker, wherein the linear combination of the first ranker and the second ranker is of the form $s_F = s_1 + ws_2$, wherein $s_F$ is a final score for a training point with respect to a query output by the linear combination, $s_1$ is a score for the training point with respect to the query output by the first ranker, $s_2$ is a score for the training point with respect to the query output by the second ranker, and w is a weight used to modify scores output by the second ranker,
   wherein the combiner component computes w to optimize the linear combination of the first ranker and the second ranker with respect to an information retrieval metric method, and wherein the combiner component computes w based upon first scores for respective training points assigned by the first ranker and second scores for the respective training points assigned by the second ranker.

10. The system of claim 9, wherein the components further comprise a gradient estimator component that determines the estimated gradient.

11. The system of claim 9, wherein the first ranker is a neural network and the second ranker is a regression tree.

12. The system of claim 9, wherein the trainer component uses a boosting algorithm to train the second ranker.

13. The system of claim 12, wherein the boosting algorithm is a Multiple Additive Regression Tree algorithm.

14. The system of claim 12, wherein the combiner component optimizes or substantially optimizes the linear combination of the first ranker and the second ranker with respect to an information retrieval metric method.

15. The system of claim 9, wherein the trainer component receives a second estimate of a gradient of a cost with respect to at least the linear combination of the first ranker and the second ranker and trains a third ranker based at least in part upon the received second estimate, and further wherein the combiner component linearly combines the third ranker with the linear combination of the first ranker and the second ranker.

16. The system of claim 9, wherein the estimated gradient is a lambda gradient.

17. The system of claim 9, wherein the estimated gradient indicates a strength and direction that an item is desirably moved in a ranked list of items.

18. A method comprising the following computer-executable acts:

causing a processor to receive estimated gradients of cost for a baseline ranker, wherein the baseline ranker is configured to output scores for documents that are indicative of positions of the documents in ranked lists of documents with respect to a plurality of queries, wherein the estimated gradients correspond to the documents and the plurality of queries;

causing the processor to train a second ranker based at least in part upon the received estimated gradients, wherein the second ranker is configured to output scores for the documents that are indicative of positions of the documents in ranked lists of documents with respect to the plurality of queries, wherein the second ranker outputs scores that are non-identical to scores output by the baseline ranker; and linearly combining the baseline ranker with the second ranker to generate a linear combination of the baseline ranker and the second ranker, wherein the linear combination of the baseline ranker and the second ranker is of the form $s_F = s_1 + w s_2$, wherein $s_F$ is a final score for a training point with respect to a query output by the linear combination, $s_1$ is a score for the training point with respect to the query output by the baseline ranker, $s_2$ is a score for the training point with respect to the query output by the second ranker, and w is a weight used to modify scores output by the second ranker, wherein w is computed to optimally linearly combine the second ranker with the baseline ranker with respect to an information retrieval metric method, and wherein computing w comprises:

receiving first scores for a plurality of training points, wherein each training point in the plurality of training points is individually assigned a score by the baseline ranker; and receiving second scores for the plurality of training points, wherein each training point in the plurality of training points is individually assigned a score by the second ranker, wherein w is computed based at least in part upon the first scores and the second scores.

* * * * *